United States Patent
Imada (10) Patent No.: US 7,584,310 B2
(45) Date of Patent: Sep. 1, 2009

(54) SIGNAL PROCESSING DEVICE

(75) Inventor: Shougo Imada, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 295 days.

(21) Appl. No.: 11/812,625

(22) Filed: Jun. 20, 2007

(65) Prior Publication Data

US 2007/0299992 A1 Dec. 27, 2007

(30) Foreign Application Priority Data

Jun. 23, 2006 (JP) ............................. 2006-174641

(51) Int. Cl.
*G06F 13/24* (2006.01)
*G06F 17/00* (2006.01)
(52) U.S. Cl. .................. 710/49; 710/262; 713/400; 713/503; 701/114
(58) Field of Classification Search ......... 710/260–266, 710/48–49; 713/400–431, 501–503; 341/100; 701/114
See application file for complete search history.

(56) References Cited

U.S. PATENT DOCUMENTS

| | | | | |
|---|---|---|---|---|
| 4,554,639 A | * | 11/1985 | Baker et al. ................... 702/1 |
| 5,031,095 A | * | 7/1991 | Hara et al. .................. 709/236 |
| 5,555,420 A | * | 9/1996 | Sarangdhar et al. ......... 710/266 |
| 5,822,378 A | * | 10/1998 | Van Veldhuizen ........... 375/334 |
| 5,850,338 A | * | 12/1998 | Fujishima ...................... 700/3 |
| 6,473,687 B2 | * | 10/2002 | Ando ......................... 701/114 |
| 2001/0011206 A1 | * | 8/2001 | Ando ......................... 701/114 |
| 2002/0030586 A1 | * | 3/2002 | Katou et al. ............... 340/5.72 |

FOREIGN PATENT DOCUMENTS

| | | |
|---|---|---|
| JP | A 2004-239085 | 8/2004 |
| JP | A 2004-239772 | 8/2004 |

\* cited by examiner

*Primary Examiner*—Christopher B Shin
(74) *Attorney, Agent, or Firm*—Oliff & Berridge, PLC

(57) ABSTRACT

A signal processing device includes a start time obtaining part that obtains a start time when a predetermined process is started in response to an interrupt request associated with a valid edge of a pulse input signal, an edge occurrence time obtaining part that obtains a time of occurrence of the valid edge of the pulse input signal after the start time of the predetermined process is obtained, and a processing part that selectively performs a process based on a time relationship between the start time of the predetermined process and the time of occurrence of the valid edge.

12 Claims, 9 Drawing Sheets

SIGNAL PROCESSING DEVICE

BACKGROUND OF THE INVENTION

1. Field of the Invention

The present invention relates to a signal processing device suitably applied to, for example, an electronic control unit for engines.

2. Description of the Related Art

In the field of engine control, various controls are executed by processing signals by software. For example, an input circuit equipped with an input capture function receives a pulse input signal from a crankshaft sensor attached to a crankshaft. The input circuit detects the edges and/or level of the pulse input signal. Then, a software process is carried out to measure the pulse interval and period. Another software process may be carried out in synchronism with the edges of the pulse input signal.

The input capture function is a specific function of detecting the occurrence of a valid edge and latching the time (timer value) when the valid edge occurs. In other words, the input capture function generates an interrupt signal in synchronism with the rising or falling edges of the signals and records the time of occurrence of the interrupt signal in collaboration with a timer. The input capture function makes it possible to accurately measure the pulse width and period and to execute an interrupt process in synchronism with the rising or falling edges of the signals. The input capture function is described in, for example, Japanese Patent Application Publication No. 2004-239772.

The software processing utilizing the above-mentioned input capture function is capable of determining whether the valid edge is a rising edge or a falling edge by reading the signal level of the valid edge immediately after this valid edge occurs.

There is a possibility that a time lag (time difference) may occur between the occurrence of the valid edge (at the time of the occurrence of the interrupt signal by hardware process) and the reading of the signal level by software process. Such a time lag may arise from various factors. For example, a time lag may occur when a higher-priority process is executed. Another new valid edge may occur between the hardware process and the subsequent software process. If another new edge occurs prior to reading the signal level, the signal level may be erroneously read. If the software process uses erroneous signal level information, error may take place.

Figure 1:
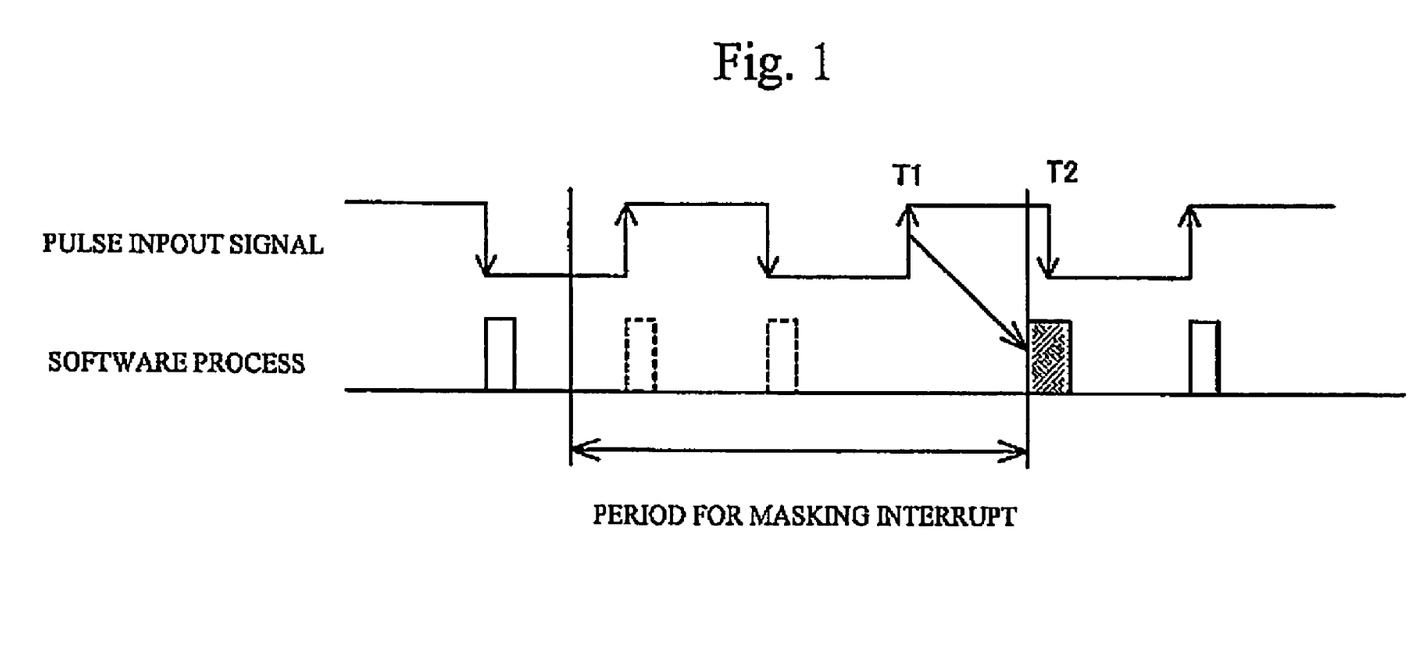
FIG. 1 shows a problem that occurs after masking is released.

Further, as shown in FIG. 1, a similar problem may occur in a case where the interrupt process is masked for a given time and this masking is then released. For example, engine control executes a sequence as shown in FIG. 1, in which the interrupt process is masked for a given period of time in order to eliminate noise that arises from activation of an engine starter. However, a problem as shown in FIG. 1 may occur. In FIG. 1, T1 denotes the time when a valid edge occurs. The valid edge occurrence time T1 is acquired by software and masking is then released. An interrupt process P1 by software reads the current signal level. However, the interrupt process P1 by software cannot make a decision as to whether the above read signal level is a past signal level prior to time T2 or a new signal level after time T2 when another new signal edge is available. Thus, the software process may use erroneous signal level information.

SUMMARY OF THE INVENTION

The present invention has been made in view of the above circumstances and provides a signal processing device capable of preventing the occurrence of an inappropriate signal due to the delay in initiating a software process for an input circuit to which a pulse input signal is applied.

According to an aspect of the present invention, there is provided a signal processing device including: a start time obtaining part that obtains a start time when a predetermined process is started in response to an interrupt request associated with a valid edge of a pulse input signal; an edge occurrence time obtaining part that obtains a time of occurrence of the valid edge of the pulse input signal after the start time of the predetermined process is obtained; and a processing part that selectively performs a process based on a time relationship between the start time of the predetermined process and the time of occurrence of the valid edge.

According to another aspect of the present invention, there is provided a signal processing device including: a start time obtaining part that obtains a start time when a predetermined process is started in response to an interrupt request associated with a valid edge of a pulse input signal; a signal level capturing part that captures a current signal level of the pulse input signal after the start time of the predetermined process is obtained; an edge occurrence time obtaining part that obtains a time of occurrence of the valid edge of the pulse input signal stored in a capture register after obtaining the signal level of the pulse input signal; and a processing part that selectively performs a process based on a time relationship between the start time of the predetermined process and the time of occurrence of the valid edge.

According to yet another aspect of the present invention, there is provided a signal processing device including: a first edge occurrence time obtaining part that obtains a time of occurrence of a valid edge of a pulse input signal stored in a capture register and stores the time of occurrence of the valid edge in a first memory, when a predetermined process is performed in response to an interrupt request associated with the valid edge of the pulse input signal; a signal level capturing part that obtains a current signal level of the pulse input signal after the time of occurrence of the valid edge in the first memory; a second edge occurrence obtaining part that obtains the time of occurrence of another valid edge of the pulse input signal stored in the capture register after the signal level of the pulse input signal is obtained; and a processing part that selectively performs a process based on a time relationship between the time of occurrence of the valid edge stored in the first memory and the time of occurrence of said another valid edge stored in the second memory.

According to a further aspect of the present invention, there is provided a signal processing device including: an input signal capturing part that captures a signal level of a pulse input signal and a time of occurrence of a valid edge of the pulse input signal when an interrupt request associated with the occurrence of the valid edge is generated; and a processing part that identifies a type of the valid edge by referring to the signal level captured by the input signal capturing part and executes a predetermined process based on the type of the valid edge and the time of occurrence of the valid edge, wherein when there is an error in a relationship between the signal level captured and the time of occurrence of the valid edge, the input signal capturing part captures the signal level again.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given, with reference to the accompanying drawings, of preferred embodiments of the present invention.

Figure 2:
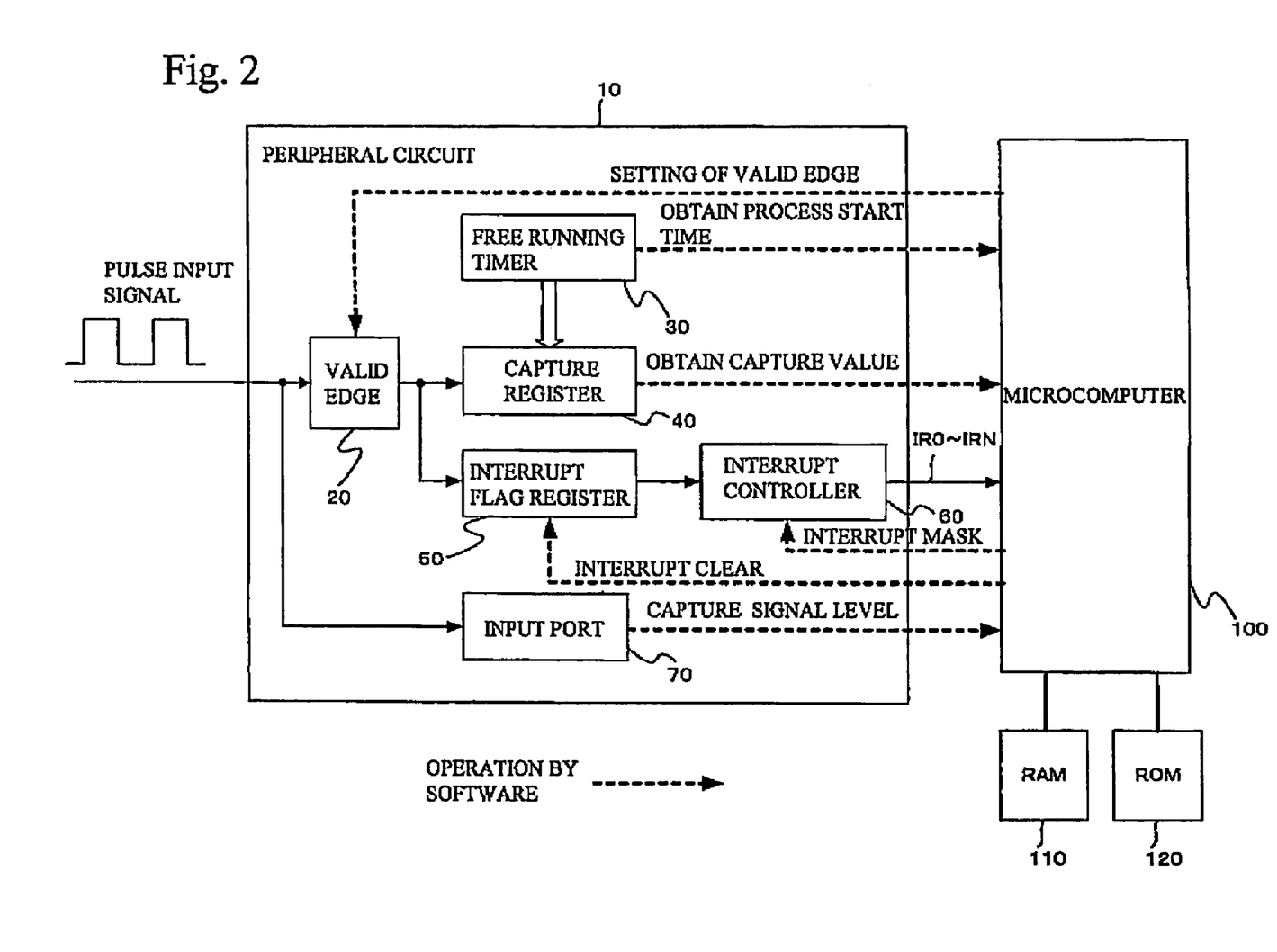
FIG. 2 is a block diagram of a hardware structure of a signal processing device in accordance with an embodiment of the present invention.

FIG. 2 is a block diagram of a hardware structure of a signal processing device in accordance with a first embodiment of the present invention. The signal processing device includes a microcomputer 100, a RAM (Random Access Memory) 110, a ROM (Read Only Memory) 120, and a peripheral circuit 10 of the microcomputer 100. The peripheral circuit 10 functions as an input circuit for the microcomputer 100. The signal processing device thus configured may be applied to an electronic control unit, which may be capable of performing pulse detection, fuel injection control and/or ignition control, as will be described later.

The microcomputer 100 reads a variety of software stored in the ROM 120 and writes the software in the RAM 110 for execution. The microcomputer 100 executes a control process, as will be described later. The microcomputer 100 implements, in cooperation with software, various parts such as a start time obtaining part, an edge occurrence time obtaining time, a signal level capturing part, a first edge occurrence time obtaining part, a second edge occurrence time obtaining part, an input signal obtaining part and a processing part. The software is stored in the RAM 110 and/or ROM 120.

The peripheral circuit 10 includes a valid edge detection circuit 20, a free running timer 30, a capture register 40, an interrupt flag register 50, an interrupt controller 60, and an input port 70. The valid edge detection circuit 20 may function as an input circuit. The peripheral circuit 10 is equipped with an input capture function, which makes it possible to obtain the occurrence of a valid edge of a pulse input signal by the valid edge detection circuit 20 and to latch the time (timer value) in the capture register 40 when tee valid edge occurs. The pulse input signal may, for example, be a signal from a crankshaft sensor or a vehicle speed sensor.

The valid edge detection circuit 20 receives the pulse input signal and detects a valid edge (rising and/or falling edge) thereof. When the circuit 20 detects the valid edge, it outputs a detection signal to the capture register 40 and the interrupt flag register 50. The edge of the input pulse signal that should be determined to be valid by the valid edge detection circuit 20 is specified by a software process by the microcomputer 100.

The free running timer 30 consists of, for example, 16 bits and continues to increase in value. When the free ruing timer 30 overflows, it returns to the initial value and increases the counter value again.

The capture register 40 receives the detection signal of the valid edge from the valid edge detection circuit 20, and latches the count value (time) of the free running timer 30. The timer value stored in the capture register 40 is updated each time the valid edge detection circuit 20 outputs the valid edge detection signal.

The interrupt flag register 50 receives the valid edge detection signal from the valid edge detection circuit 20, and turns on the interrupt flag (changes the interrupt flag to 1 from 0). The interrupt flag may be cleared (turned of) by a software process by the microcomputer 100.

The interrupt controller 60 may generate various interrupt request signals IR0 through IRN when the valid flag in the valid flag register 50 is turned on, and supplies these interrupt request signals to the microcomputer 100. The interrupt request signals IR0~IRN may be selectively masked by an interrupt masking process of software executed by the microcomputer 100.

The input port 70 receives the pulse input signal and detects its signal level. The signal level thus detected is read by a software process by the microcomputer 100.

A description will now be given, with reference to a flowchart of FIG. 3, of a first exemplary interrupt process by the microcomputer 100.

An interrupt request arises from the occurrence of a valid edge of the input pulse signal, and the interrupt controller 60 supplies the microcomputer 100 with the interrupt signal. Then, the microcomputer 100 may initiate the interrupt routine shown in FIG. 3 taking into consideration the priority of the interrupt signal and the status of another process. In other words, the interrupt routine shown in FIG. 3 is not fully synchronized with the occurrence of valid edge of the input pulse signal.

When the interrupt routine is initiated by the microcomputer 100, the interrupt flag in the flag register 50 is once cleared by a hardware configuration.

Figure 3:
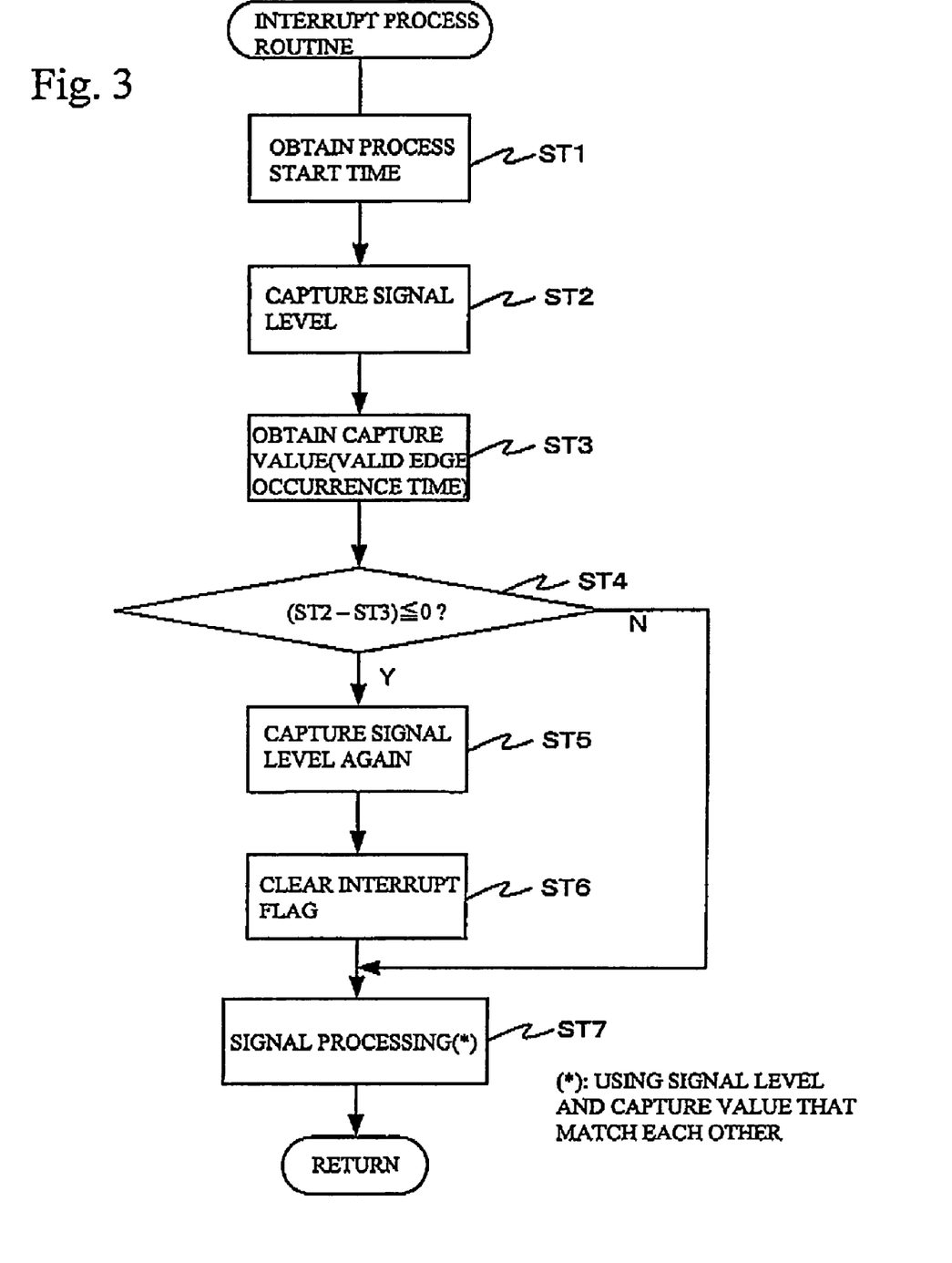
FIG. 3 is a flowchart of a first exemplary interrupt process executed by a microcomputer shown in FIG. 2.
Figure 4A:
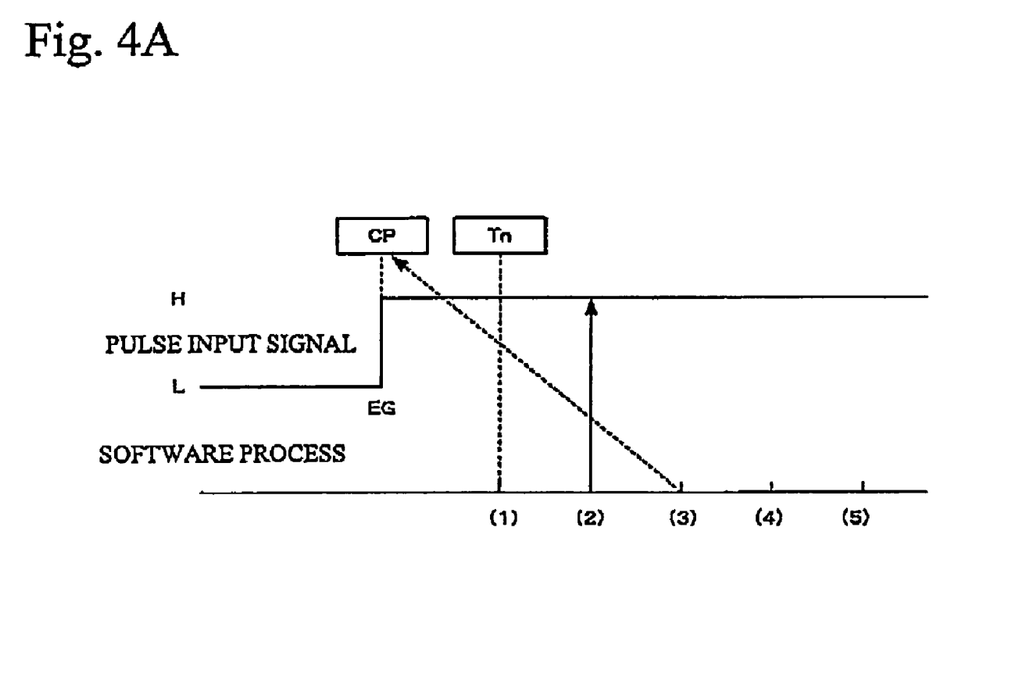
FIG. 4A is a timing chart showing a case where the start time leads to the time indicated by the capture value.
Figure 4B:
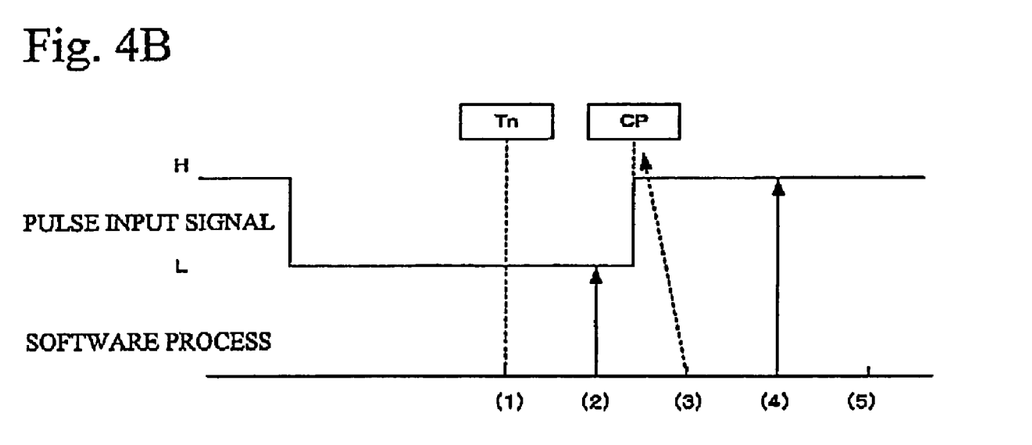
FIG. 4B is a timing chart showing another case where the start time lags behind the time indicated by the capture value.

In the interrupt routine shown in FIG. 3, the microcomputer 100 reads the time value of the free running timer 30, and obtains the process start time (step ST1). In the process of step ST1, two cases respectively shown in FIGS. 4A and 4B may take place. In FIG. 4A, immediately after a valid edge occurs and a time value (captured value) CP is latched in the capture register 40, the process start time Tn is read from the free running timer 30 at time (1). In FIG. 4B, immediately after the process start time Tn is read from the free running timer 30 at time (1), a valid edge occurs and the timer value (captured value) CP is latched in the capture register 40.

Next, the microcomputer 100 accesses the input port 70 and captures the signal level of the pulse input signal (step S12). The signal level of the pulse input signal is captured in order to determine whether the valid edge of interest is a rising edge or falling edge. For example, in the case shown in FIG. 4A, the signal level is read at time (2) at which the signal level is at "H". In the case shown in FIG. 4B, the signal level is read at time (2) at which the signal level is at "L".

Then, the microcomputer 100 reads the captured value (valid edge occurrence time) CP from the capture register 40 (step ST3). In the case shown in FIG. 4A, the capture value CP read at time (3) matches the signal level ("H") captured at time (2). In contrast, in FIG. 4B, a new valid edge occurs between times (2) and (3). The captured value CP read at time (3) mismatches with the signal level ("L") obtained at time (2). Further, the interrupt flag in the interrupt flag register 50 is on due to the occurrence of the new edge between times (2) and (3).

Then, the microcomputer 100 compares the process start time Tn obtained from the free running timer 30 with the captured value (valid edge occurrence time) CP obtained from the capture register 40 (step ST4). When the process start time Tn is greater (earlier) than the captured value CP as shown in FIG. 4A, the microcomputer 100 determines that the captured value CP and the signal level match each other, and executes a predetermined signal process (software process using the captured value CP and/or the signal level (step ST7).

In contrast, when the process start time Tn is less (later than) the captured value CP a shown in FIG. 4B, the microcomputer 100 determines that the captured value CP and the signal level mismatch each other. In this case, the microcomputer 100 accesses the input port 70 again and newly captures the signal level of the pulse input signal (step ST5). It is thus possible to newly capture the signal level of the pulse input signal that matches the captured value CP.

As shown in FIG. 4B, a value edge occurs between times (2) and (3). Thus, the interrupt flag in the interrupt flag register 50 is kept on, which may cause an unwanted interrupt process. Thus, the interrupt flag in the interrupt flag register 50 is cleared (turned off) by software processing (step ST6). The microcomputer 100 performs a predetermined signal process (software processing) using the captured CP and the newly captured signal level (step ST7).

As described above, according to the present embodiment, the microcomputer 100 obtains the process start time Tn, the signal level, and the captured value (valid edge occurrence time) CP from the peripheral circuit 10 in that order. Then, the microcomputer 100 executes the process for capturing the signal level of the pulse input signal again on the basis of the relationship between the process start time Tn and the valid edge occurrence time CP. It is thus possible to reliably capture the signal level that matches the captured value (valid edge occurrence time) and to prevent the occurrence of an inappropriate signal process that arises from the delay in initiating the software processing (interrupt process).

Figure 5:
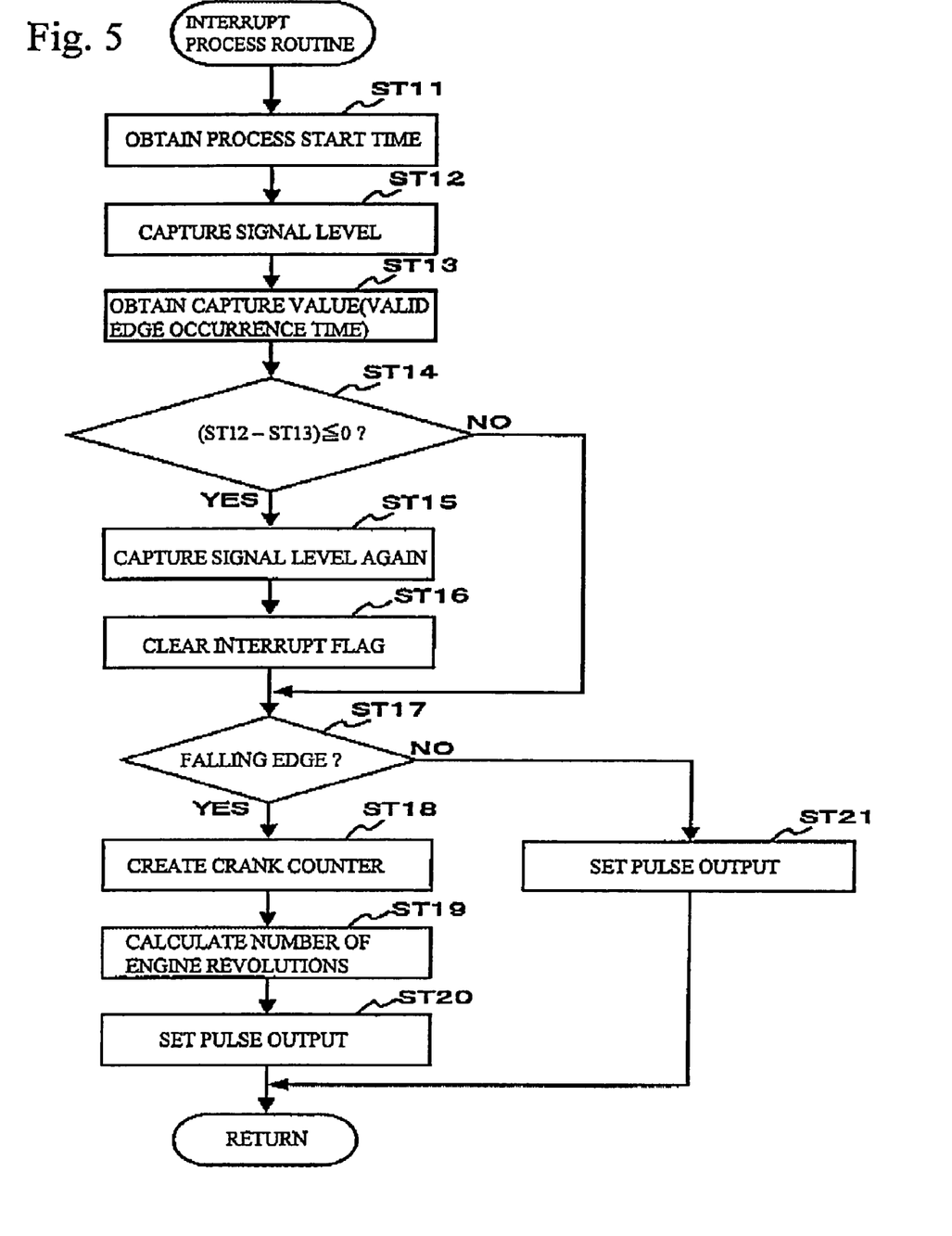
FIG. 5 is a flowchart of a second exemplary interrupt process executed by the microcomputer.

Next, a description will be given, with reference to a flowchart of FIG. 5, of a second exemplary interrupt process executed by the microcomputer 100. Steps ST11~ST16 shown in FIG. 5 are the same as steps ST11~ST16 shown in FIG. 3, and a description thereof will be omitted here. As in the case of the previous embodiment, the interrupt flag in the interrupt flag register 50 is once cleared by the hardware configuration when the interrupt process routine is initiated by the microcomputer 100.

At step ST14, the microcomputer 100 compares the process start time Tn with the captured value (valid edge occurrence time) CP. Since the capture register 40 is capable of capturing the rising and falling edges, the captured value (valid edge occurrence time) CP is updated each time the level of the pulse input signal switches.

When the process start time Tn is equal to or less than the valid edge occurrence time CP (Yes at step ST14), the microcomputer 100 determines the captured value and the signal level mismatch, and accesses the input port 70 again to capture the signal level of the pulse input signal (step ST15).

During the time when the process of steps ST11~ST13 is being performed, if a new edge takes place, the microcomputer 100 captures the signal level again at step ST15. However, it is essentially enough to capture the signal level again only when a new edge occurs between steps ST12 and ST13. It is to be noted that the interrupt routine cannot distinguish a new edge that occurs between steps ST11 and ST21 from another new edge that occurs between steps ST12 and ST13. Taking the above into consideration, if the microcomputer 100 determines that a new edge occurs between steps ST12 and ST13, the microcomputer 100 assumes that the above new edge occurred between steps ST12 and ST13, and obtains the signal level again.

There is a possibility that an unnecessary interrupt takes place due to the fact that the interrupt flag in the interrupt flag register 50 is on. Thus, the microcomputer 100 clears (turns off) the interrupt flag register 50 by software processing (step ST16). That is, the microcomputer 100 clears the interrupt flag that occurs until the signal level is captured again after the interrupt routine is started. More specifically, when the signal level is being captured again, the microcomputer 100 is performing a process responsive to an edge that newly occurs, the microcomputer 100 clears the interrupt flag based on au edge that newly occurs.

Then, the microcomputer 100 determines whether the edge that occurs at the time retained as the captured value (valid edge occurrence time) is a falling edge by referring to the signal level obtained at step ST12 or the signal level that is newly obtained at step ST15. The microcomputer 100 performs different processes for different cases respectively associated with the rising and falling edges. For this purpose, the microcomputer 100 performs the process of step ST17. For example, the microcomputer 100 performs a process of computing the number of revolutions of the engine at the time of a falling edge and performs another process of canceling outputting of an ignition pulse at the time of a rising edge.

When the microcomputer 100 determines that the edge of interest is a falling edge (YES at step ST17), it generates a crank counter (step ST18), and computers the number of engine revolutions (180-degree crank angle time) (step ST19).

Figure 6:
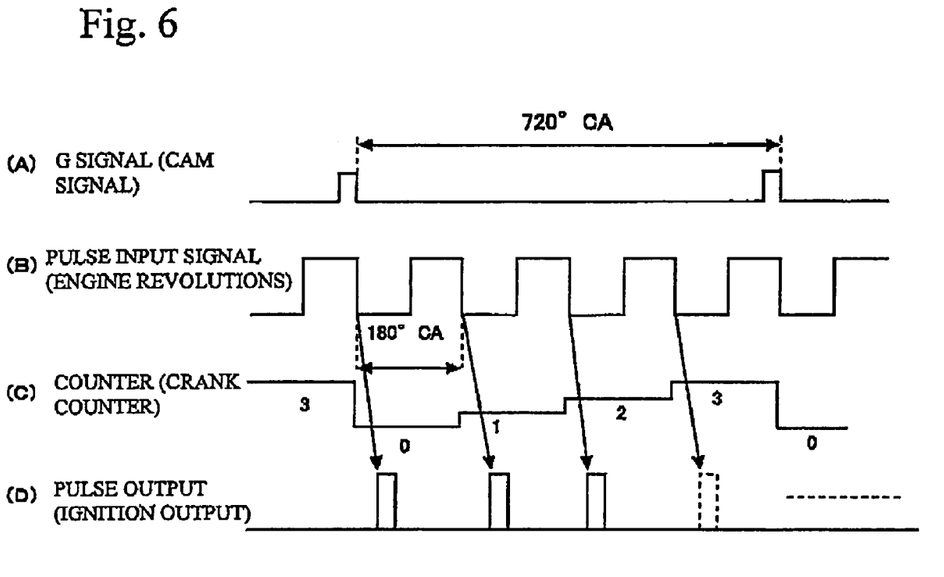
FIG. 6 is a timing chart of a pulse signal (which may be named G signal and may be a can signal) (A), a pulse input signal (which may be an engine revolution signal) (B), a counter (which may be a crank counter) (C) and a pulse output ignition output) (D)

FIG. 6 shows an exemplary pulse input signal (for example, an engine revolution signal) (see part (B)), a crank counter created in synchronism with the falling edge of the pulse input signal (see part (C)), and a pulse signal generated for ignition, injection or the like when the crank counter indicates a given value (see part (D)). Further, FIG. 6 shows a pulse signal which may be a cam signal, named G signal.

The crank counter is used to count the number of engine revolutions for engine control. For example, when the crank counter indicates a given value, a predetermined process such as ignition and injection is carried out.

The G pulse signal is generated in association with a motion of the cam shaft that rotates by one revolution for every two revolutions of the crank shaft (720-degree crank angle).

The microcomputer 100 calculates the time necessary for the engine to rotate by a 180-degree crank angle by referring to the time when the present falling edge occurs and the time when the previous falling edge occurs, and calculates the number of engine revolutions from the time equal to the 180-degree crank angle.

Figure 6A:
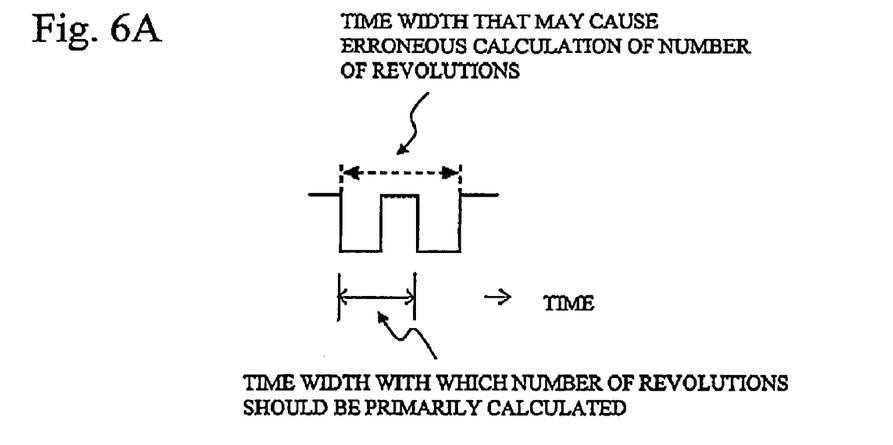
FIG. 6A shows a problem that may be caused in association with the operation shown in FIG. 6.

If a new edge of the pulse input signal occurs until the signal level of the pulse input signal is obtained and the captured value (valid edge occurrence time) is then obtained, there is a possibility that the number of engine revolutions may be erroneously calculated by using an erroneous edge occurrence time, as indicated by a broken line shown in FIG. 6A.

The present embodiment performs the process for capturing the signal level of the pulse input signal again on the basis of the time relationship between the process start time Tn and the valid edge occurrence time CP. It is thus possible to reliably obtain the signal level that matches the captured value (valid edge occurrence time) CP.

The microcomputer 100 sets a pulse output (step S120). Then, the microcomputer 100 outputs the pulse output in accordance with a process routine different from the present interrupt routine. A one-shot pulse may be output when the falling edge of the pulse input signal occurs.

When the determination result of step ST17 shows that the present edge is not a falling edge but a rising edge (NO at step ST17), the microcomputer 100 cancels the pulse output (step ST21).

The pulse output is cancelled as a guard process in case where the pulse output is not set due to a certain factor such as input variations in the pulse input signal or the pulse output is already set nevertheless the pulse output process is not yet performed.

Thus, if the pulse input signal (such as ignition pulse) thus set is not output within a given period of time (until the rising edge occurs) due to a delay in processing or the like, the ignition pulse is not output. Similarly, the ignition pulse is not output (igniting process is not performed) during the period when the pulse edge interrupt process is inhibited for starter activation. The engine does not stop in the absence of a few ignitions. Thus, the present embodiment is preferably designed to stop the ignition process to avoid the erroneous ignition process.

The second interrupt process mentioned above has similar advantages to those of the first interrupt process. It is possible to reliably obtain the signal level that matches the captured value (valid edge occurrence time) CP and prevent the occurrence of an inappropriate signal process due to the delay in initiating the software process (interrupt process).

A description will now be given, with reference to a flowchart of FIG. 7, of a third exemplary interrupt process by the microcomputer 100. When the interrupt routine is initiated by the microcomputer 100, the interrupt flag in the flag register 50 is once cleared by a hardware configuration.

In the third process, the microcomputer 100 reads the captured value (valid edge occurrence time) CP from the capture register 40 (step sT31). The captured value CP thus read is stored in memory A, which may be a region formed in a rewritable memory such as the RAM 110 used in processing of the microcomputer 100.

Next, the microcomputer 100 access the input port 70 and captures the signal level of the pulse input signal (step ST32).

When a predetermined time elapses, the microcomputer 100 reads the captured value (valid edge occurrence time) from the capture register 40 again, and stores it in memory B (step ST33). The memory B is a region that is formed in a rewritable memory such as the RAM 110 and is different from the memory A and the capture register 40.

The microcomputer 100 determines whether the captured value (valid edge occurrence time) CP stored in the memory A coincides with the captured value (valid edge occurrence time) stored in the memory B.

Figure 8A:
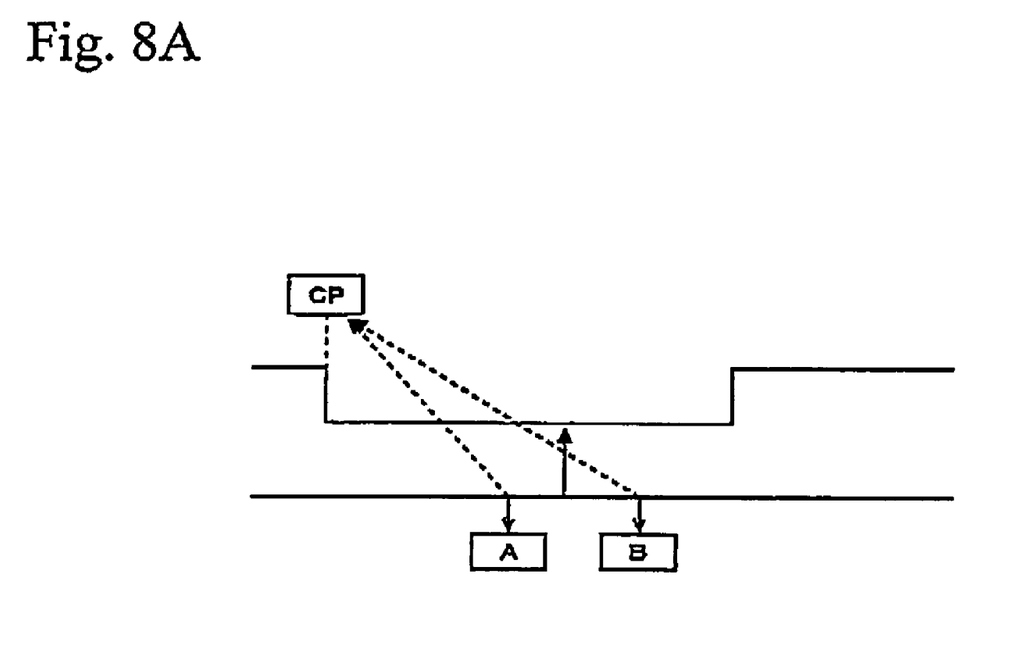
FIG. 8A shows a case where the start time leads to the time indicated by the capture value.

As shown in FIG. 8A, the captured values in the memories A and B coincide with each other when no valid edge occurs until the captured value (valid edge occurrence time) CP is written into the memory B after the captured value (valid edge occurrence time) CP is written into the memory A.

Figure 8B:
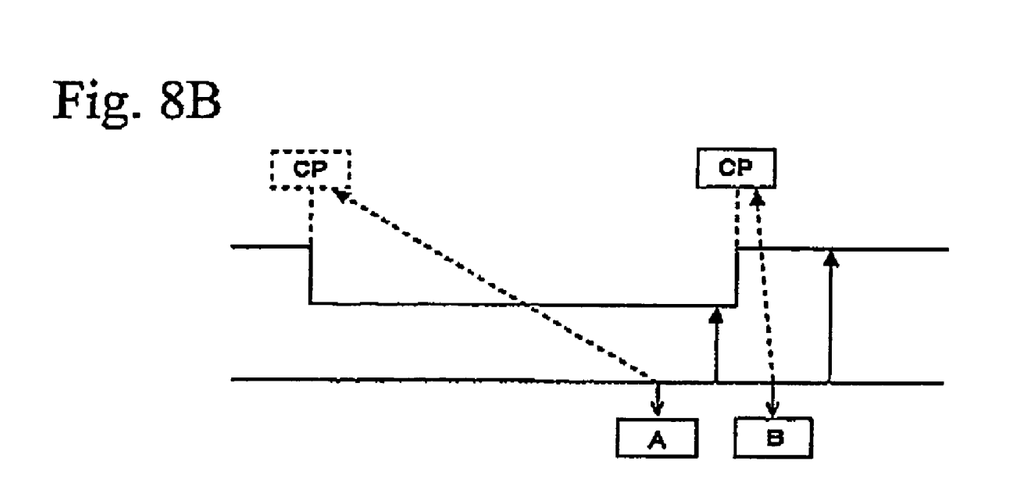
FIG. 8B shows another case where the start lime lags behind the time indicated by the capture value.

As shown in FIG. 8B, the captured values in the memories A and B do not coincide with each other when a valid edge occurs until the captured value (valid edge occurrence time) CP is written into the memory B after the captured value (valid edge occurrence time) CP is written into the memory A.

When the captured values stored in the memories A and B coincide with each other, the microcomputer 100 proceeds to step ST37, and determines, from the captured signal level, whether the edge that occurs at the time stored as the captured value (valid edge occurrence time) CP is a falling edge. The subsequent process is the same as the flow shown in FIG. 5.

When the captured values in the memories A and B do not coincide with each other, as shown in FIG. 8B, the microcomputer 100 accesses the input port 70 and captures the signal level of the pulse input signal again (step ST35). After that, the microcomputer 100 clears (turns off) of the interrupt flag in the interrupt flag register 50 by software processing (step ST36), and determines whether the edge that occurs at the time stored as the captured value (valid edge occurrence time) CP is a falling edge (step ST37). The subsequent process is the same as the flow shown in FIG. 5.

The third interrupt process has similar advantages as those of the first and second interrupt processes. It is possible to reliably obtain the signal level that matches the captured value (valid edge occurrence time) CP and prevent the occurrence of an inappropriate signal process due to the delay in initiating the software process (interrupt process).

A fourth exemplary interrupt process will be described with reference to FIG. 9. When the interrupt routine is initiated by the microcomputer 100, the interrupt flag in the flag register 50 is once cleared by a hardware configuration.

The microcomputer 100 reads the captured value (valid edge occurrence time) CP from the capture register 40 (step ST53), and clears (turns off) the interrupt flag in the interrupt flag register 50 by software processing (step ST54).

The process start time Tn is compared with the captured value (valid edge occurrence time) CP each time the signal level is captured again. It is thus possible to improve the reliability of processing.

More specifically, the microcomputer 100 compares the process start time Tn with the captured value (valid edge occurrence time) CP. When the process start time Tn is less than the captured value (valid edge occurrence time) CP (NO at step ST55), the process is repeated starting from step ST51.

When the process start time Tn is equal to or greater than the captured value (valid edge occurrence time) CP (YES at step ST55), the microcomputer 100 determines whether the edge that occurs at the time retained as the captured value (valid edge occurrence time) CP is a filling edge (step ST56). The subsequent process is the same as the flow shown in FIG. 5.

Figure 7:
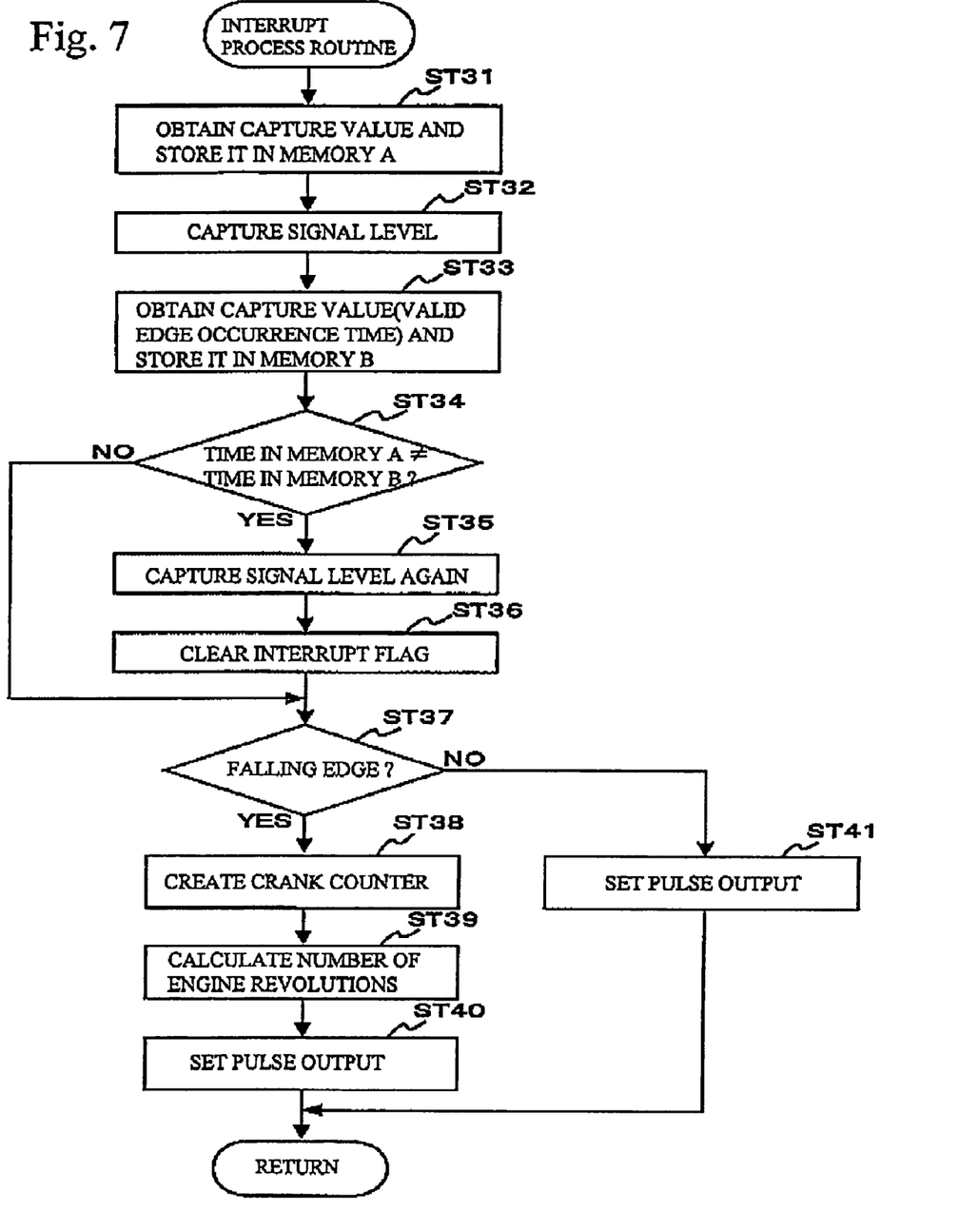
FIG. 7 is a flowchart of a third exemplary interrupt process executed by the microcomputer.
Figure 9:
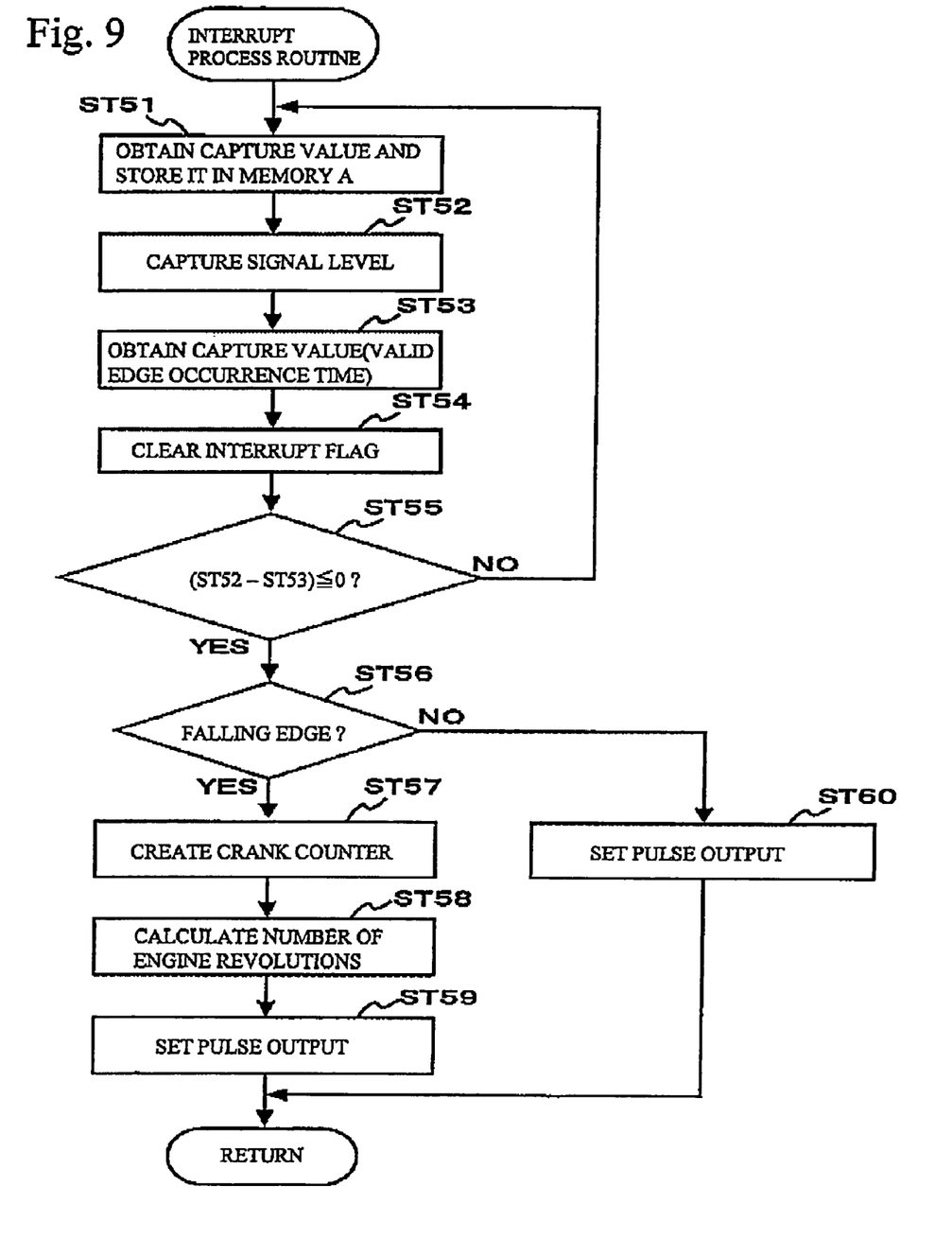
FIG. 9 is a flowchart of a fourth exemplary interrupt process executed by the microcomputer.

The flowchart of FIG. 9 may be applied to the flow of storing the captured values in the memories A and B and comparing these values with each other as shown in FIG. 7. Assuming that the captured value (valid edge occurrence time) CP stored in the memory A is compared with the captured value (valid edge occurrence time) CP stored in the memory B at step ST34 shown in FIG. 7, the microcomputer 100 returns to step ST31 and stores the captured value (valid edge occurrence time) CP in the memory A again.

The fourth interrupt process has similar advantages as those of the first through third interrupt processes. It is possible to reliably capture the signal level that matches the captured value (valid edge occurrence time) CP and prevent the occurrence of an inappropriate signal process due to the delay in initiating the software process (interrupt process).

The present invention is not limited to engine control but is applicable to other electronic control.

The present invention is not limited to the specifically disclosed embodiments, but may include other embodiments and variations without departing from the scope of the present invention.

The present invention is based on Japanese Patent Application No. 2006-174641 filed on Jun. 23, 2006, the entire disclosure of which is hereby incorporated by reference.

What is claimed is:

1. A signal processing device comprising:
   a start time obtaining part that obtains a start time when a predetermined process is started in response to an interrupt request associated with a valid edge of a pulse input signal;
   an edge occurrence time obtaining part that obtains a time of occurrence of the valid edge of the pulse input signal after the start time of the predetermined process is obtained; and
   a processing part that selectively performs a process based on a time relationship between the start time of the predetermined process and the time of occurrence of the valid edge.

2. The signal processing device according to claim 1, further comprising an input circuit that detects the valid edge of the pulse input signal and has a function of storing the time of occurrence of the valid edge, wherein the edge occurrence time obtaining part reads the time of occurrence of the valid edge stored in the input circuit.

3. The signal processing device according to claim 1, wherein the processing part obtains a signal level of the pulse input signal after the start time of the predetermined process is obtained and before the time of offence of the valid edge is obtained, and executes process of obtaining a signal level again when the time of occurrence of the valid edge is later than the start time of the predetermined process.

4. The signal processing device according to claim 3, wherein the processing part obtains the signal level of the pulse input signal again and executes a process of inhibiting occurrence of the interrupt request associated with the valid edge of the pulse input signal.

5. The signal processing device according to claim 1, wherein the start time obtaining part and the edge occurrence time obtaining part obtain the start time of the predetermined process and the time of occurrence of the valid edge from a common timer.

6. A signal processing device comprising:
   a start time obtaining part that obtains a start time when a predetermined process is started in response to an interrupt request associated with a valid edge of a pulse input signal;
   a signal level capturing part that captures a current signal level of the pulse input signal after the start time of the predetermined process is obtained;
   an edge occurrence time obtaining part that obtains a time of occurrence of the valid edge of the pulse input signal stored in a capture register after obtaining the signal level of the pulse input signal; and
   a processing part that selectively performs a process based on a time relationship between the start time of the predetermined process and the time of occurrence of the valid edge.

7. The signal processing device according to claim 6, further comprising an input circuit detects the valid edge that includes a rising edge and a failing edge, and stores the time of occurrence of the rising or falling edge detected in the capture register, wherein the input circuit stores the time of occurrence of the rising edge and the time of occurrence of the falling edge in an identical region of the capture register.

8. The signal processing device according to claim 7, wherein the pulse input signal is associated with revolutions, and when at least one of the rising and falling edges is detected, the processing part obtains the revolutions by using the time of occurrence of a present edge detected and the time of a previous one of the same edge as the present edge.

9. The signal processing device according to claim 7, wherein the processing part executes a process for a case where the valid edge is a rising edge and executes another different process for another case where the valid edge is a falling edge.

10. A signal processing device comprising:
    a first edge occurrence time obtaining part that obtains a time of occurrence of a valid edge of a pulse input signal stored in a capture register and stores the time of occurrence of the valid edge in a first memory, when a predetermined process is performed in response to an interrupt request associated with the valid edge of the pulse input signal;
    a signal level capturing part that obtains a current signal level of the pulse input signal after the time of occurrence of the valid edge in the first memory;
    a second edge occurrence obtaining part that obtains the time of occurrence of another valid edge of the pulse input signal stored in the capture register after the signal level of the pulse input signal is obtained; and
    a processing part that selectively performs a process based on a time relationship between the time of occurrence of the valid edge stored in the first memory and the time of occurrence of said another valid edge stored in the second memory.

11. A signal processing device comprising:
    an input signal capturing part that captures a signal level of a pulse input signal and a time of occurrence of a valid edge of the pulse input signal when an interrupt request associated with the occurrence of the valid edge is generated; and
    a processing part that identifies a type of the valid edge by referring to the signal level captured by the input signal capturing part and executes a predetermined process based on the type of the valid edge and the time of occurrence of the valid edge, wherein
    when there is an error in a relationship between the signal level captured and the time of occurrence of the valid edge, the input signal capturing part captures the signal level again.

12. The signal processing device as claimed in claim 11, wherein:
    when the interrupt request associated with the valid edge of the pulse input signal is generated, the input signal capturing part captures the signal level of the pulse input signal and then obtains the time of occurrence of the valid edge of the pulse input signal; and
    when there is a possibility that another valid edge may newly occur after the signal level is captured, the input signal capturing part captures the signal level again.

* * * * *